(12) United States Patent
Johnson et al.

(10) Patent No.: US 8,163,846 B2
(45) Date of Patent: Apr. 24, 2012

(54) CHLORINATED ETHYLENE-BASED POLYMERS AND COMPOSITIONS AND ARTICLES PREPARED THEREFROM

(75) Inventors: Gregory E. Johnson, Baton Rouge, LA (US); Maarten Aarts, Hutten (CH); Mark T. Berard, Baton Rouge, LA (US)

(73) Assignee: Dow Global Technologies LLC, Midland, MI (US)

( * ) Notice: Subject to any disclaimer, the term of this patent is extended or adjusted under 35 U.S.C. 154(b) by 693 days.

(21) Appl. No.: 12/299,145

(22) PCT Filed: Jun. 27, 2007

(86) PCT No.: PCT/US2007/072178
§ 371 (c)(1),
(2), (4) Date: Oct. 31, 2008

(87) PCT Pub. No.: WO2008/002952
PCT Pub. Date: Jan. 3, 2008

(65) Prior Publication Data
US 2009/0312499 A1  Dec. 17, 2009

Related U.S. Application Data

(60) Provisional application No. 60/817,201, filed on Jun. 28, 2006.

(51) Int. Cl.
*C08F 8/18* (2006.01)
(52) U.S. Cl. ............... 525/214; 525/334.1; 525/356
(58) Field of Classification Search ............. 525/214, 525/334.1, 356
See application file for complete search history.

(56) References Cited

U.S. PATENT DOCUMENTS

| | | | |
|---|---|---|---|
| 2,586,363 A | 2/1952 | McAlevy | |
| 3,296,222 A | 1/1967 | Dixon et al. | |
| 3,454,544 A | 7/1969 | Young et al. | |
| 4,029,862 A | 6/1977 | Liu et al. | |
| 4,197,386 A | 4/1980 | Schoen | |
| 4,412,448 A | 11/1983 | Flynn et al. | |
| 4,661,465 A | 4/1987 | Fuentes, Jr. et al. | |
| 4,749,751 A * | 6/1988 | Ennis et al. | 525/192 |
| 4,767,823 A | 8/1988 | Jones et al. | |
| 4,873,300 A | 10/1989 | Fuentes, Jr. et al. | |
| 5,242,987 A | 9/1993 | Brugel | |
| 5,272,236 A | 12/1993 | Lai et al. | |
| 5,278,272 A | 1/1994 | Lai et al. | |
| 5,446,064 A | 8/1995 | Hori et al. | |
| 6,124,406 A | 9/2000 | Cinadr et al. | |
| 6,204,334 B1 | 3/2001 | Cinadr et al. | |
| 6,248,834 B1 * | 6/2001 | Mori | 525/214 |
| 6,277,915 B1 * | 8/2001 | Lepilleur et al. | 525/76 |
| 6,313,229 B1 | 11/2001 | Cinadr et al. | |
| 6,706,815 B2 | 3/2004 | Marchand et al. | |
| 6,780,907 B2 | 8/2004 | Meltzer et al. | |

FOREIGN PATENT DOCUMENTS

| | | |
|---|---|---|
| EP | 0343657 A1 | 11/1989 |
| EP | 0561516 * | 9/1993 |
| EP | 0561516 A1 | 9/1993 |
| GB | 1096542 A | 12/1967 |
| JP | 08 113685 * | 5/1996 |
| JP | 8113685 A | 5/1996 |
| WO | WO-86/03499 A1 | 6/1986 |
| WO | WO-99/50316 A1 | 10/1999 |

OTHER PUBLICATIONS

Polymer Engineering and Science (2001), 41(11), 1893-1902.

* cited by examiner

*Primary Examiner* — Bernard Lipman

(57) ABSTRACT

The invention provides a chlorinated ethylene-based polymer, process for preparing the same, and compositions and articles prepared from the same. The chlorinated ethylene-based polymer has a low residual crystallinity, for example, less than 8 percent, a relatively high crystallization temperature, Tc, for example greater than, or equal to, 25° C., and a medium weight average molecular weight, Mw, for example, less than, or equal to, 325,000 g/mole.

46 Claims, No Drawings

US 8,163,846 B2

CHLORINATED ETHYLENE-BASED POLYMERS AND COMPOSITIONS AND ARTICLES PREPARED THEREFROM

REFERENCE TO PRIOR APPLICATION

This application claims the benefit of U.S. Provisional Application No. 60/817,201, filed on Jun. 28, 2006, incorporated herein, by reference.

FIELD OF INVENTION

The invention relates to chlorinated ethylene-based polymers. In particular, the invention provides chlorinated ethylene-based polymers with good bulk handling and good processibility. The chlorinated ethylene-based polymers can be used in polyvinyl chloride compositions to form articles with improved impact resistance and low levels of surface defects.

BACKGROUND OF THE INVENTION

Polyvinyl chloride (PVC) is widely used in both its rigid and flexible forms in applications, such as films, siding panels, window panels, sheets, fencing, decking, pipes and tubing. However, because rigid PVC is a hard and brittle thermoplastic polymer, it is often mixed with a modifier to form a composition that is less prone to failure on impact.

Chlorinated polyethylene (CPE) is used as an impact modifier component for rigid PVC compositions. In some cases, it is desirable for the CPE to be "bulk handleable," meaning that it can be shipped in bulk trucks and/or stored in silos, with minimal agglomeration of the CPE over time. Normally, CPE cannot be handled this way, because it tends to block or mass, making it hard to get the CPE out of the truck, or silo, especially if it has been stored for any length of time. The blocking tendency of the CPE can be reduced by adding large amounts of antiblock agents, such as calcium carbonate, but this addition adds an extra processing step, which increases total costs, and also introduces the antiblock itself, which may not be desirable in the rigid PVC formulations. The addition of large amounts of antiblock agents can also lead to demixing and segregation of the individual components during transportation and/or conveying of the material. Another approach is to increase the molecular weight (and viscosity) of the CPE, but this leads to problems during the extrusion of the PVC formulation. For example, the use of excessively high molecular weight CPE in PVC can result in small specks or defects in extruded window profiles, which make such a product undesirable.

Conventional chlorinated polyethylenes containing high levels of residual crystallinity (for example >10 percent), such as for example, convention block chlorinated polymers, when used in a modified PVC composition tend to have reduced impact strength. Conventional randomly chlorinated polyethylenes, and especially the lower molecular weight (Mw<150,000 g/mole) tend to have an increased in agglomeration of the polymer particles. The lower molecular weight polymers also tend to have a reduced impact strength when used in a modified PVC composition.

U.S. Pat. No. 5,446,064 (see also European Patent EP 0 618 260 B1) discloses a thermoplastic elastomer composition, comprising the following: (a) 100 parts by weight of a crystalline chlorinated polyethylene, with a chlorination degree of from 20 to 45 percent, and a heat of crystal fusion of from 5 to 35 cal/g, as measured by a DSC method, and obtained by chlorinating a polyethylene having a weight average molecular weight of from 100,000 to 750,000; (b) from 1 to 100 parts by weight of a crystalline polyolefin; and (c) from 5 to 200 parts by weight of a plasticizer.

A 5 cal/g heat of crystal fusion corresponds to a residual HDPE crystallinity in a range from 9-13 percent (as determined by calculations as described for present invention), corresponding to "20 wt percent Cl" to "45 wt percent Cl," based on the weight of the CPE.

U.S. Pat. No. 4,767,823 (see also EP 0 204 816 B1 and WO86/03499) discloses 25 a halogenated polyethylene resins and halogenated ethylene polymer resins having a reduced tendency to "block." The halogenated resins are prepared respectively from polyethylene and ethylene polymer starting materials, which have a weight-based median particle size from 120 to 600 microns, and a weight-based particle size distribution, such that more than 60 percent of the particles have a particle size from 30 130 to 850 microns. The halogenated resins also have a weight-based median particle size from 200 to 900 microns. The halogenated polyethylene resins have a chemically combined halogen content from 26 to 42 weight percent, whereas the halogenated ethylene polymer resins have a chemically combined halogen content from 15 to 28 weight percent. The halogenated ethylene polymer resins are prepared from ethylene polymer starting materials, which have polymerized therein, up to five weight percent of 1-olefin monomer copolymerizable with ethylene. In the experimental examples, a considerable amount of chlorine is added at high temperatures, greater than, or equal to, 110° C., as opposed to during the initial, lower, reaction temperatures, favoring a random chlorine distribution.

U.S. Pat. No. 6,706,815 discloses improved polyvinyl chloride compositions having excellent impact strength. In particular, the impact resistant composition comprises the following: a) a vinyl chloride polymer, b) at least one ethylene/alpha-olefin copolymer, said copolymer having a density from 0.858 to 0.91 g/cc and having a melt index from an I10 value of 0.1 to an I2 value of 10, and c) at least one randomly chlorinated olefin polymer having a chlorine content of from 20-40 percent by weight, the feedstock for said chlorinated olefin polymer having a melt index from an I10 value of 0.1 to an I2 value of 10. Optionally, these impact resistant polyvinyl chloride compositions may have inorganic filler levels from 5 to 50 parts per hundred, relative to the polyvinyl chloride polymer.

U.S. Pat. No. 4,029,862 discloses olefin polymer chlorination products having improved handling properties, and which are prepared by reacting, in a fluidized-bed state, certain free-flowing, high bulk density linear olefin polymer powders with gaseous chlorine. The olefin polymer powder used, is characterized by having a flowability, measured as angle of repose in the range of from 24° to 28°, a bulk density in the range from 25 to 35 pounds/cubic foot, and a surface area in the range from 2 to 4 square meters/gram. The individual particles of the olefin polymer particle are characterized by having particle sizes predominantly in the range from 300 to 600 microns, and porosity sufficient to provide an average free volume, within individual particles, in the range from 20 to 45 volume percent, based on total particle volume. In the examples, the chlorination temperature is maintained below 100° C. to prevent the agglomeration of polymer particles and to prevent loss of particle porosity, which affects the chlorination rate. At such low temperatures, the resulting chlorinated polymers have relatively high residual crystallinity.

U.S. Pat. No. 6,204,334 (see also U.S. Pat. Nos. 6,313,229; 6,124,406; EP 1 084 158 B1; and WO 99/50316) discloses blocky chlorinated polyolefins with high crystallinities for use as compatibilizers for PVC and/or CPVC resins with polyolefin elastomers. The blocky chlorinated polyolefins facilitate the dispersion of the elastomers, as a dispersed phase, with the proper size for impact modification of the PVC and/or CPVC. The blocky chlorinated polyolefin are disclosed as providing the following properties: better adhesion between the elastomer and the PVC and/or CPVC; better physical properties, such as impact strength as measured by Notched Izod; and better variable height impact testing (VHIT), as compared to randomly chlorinated polyolefins, often used as processing aids and as impact modifiers in PVC or CPVC. The differences in properties achieved with blocky chlorinated polyolefins versus randomly chlorinated polyolefins are attributed to the individual blocks of the blocky polyolefin being compatible (and/or co-crystalizable) with either the polyolefin elastomer or the PVC/CPVC, resulting in better adhesion between phases.

U.S. Pat. No. 6,277,915 discloses highly crystalline block chlorinated polyolefins for use as performance enhancer of high rubber graft copolymers or chlorinated polyethylenes impact modifier in PVC and/or CPVC resins. The block chlorinated polyolefins (for example, block chlorinated polyethylene) are disclosed as providing good dispersion of the impact modifier particles in the matrix, and better adhesion between the impact modifier and the PVC and/or CPVC interface, providing better physical properties, such as impact strength, as measured by Notched Izod, than did the randomly chlorinated polyolefins, often used as processing aids and as impact modifiers in PVC or CPVC. The differences in properties achieved with block chlorinated polyolefins versus randomly chlorinated polyolefins are disclosed as being attributed to the individual blocks of the blocky polyolefin being compatible with either the impact modifier or the PVC/CPVC, resulting in better adhesion between phases.

Additional block chlorinated polyolefins are disclosed in U.S. Pat. No. 6,780,907.

There remains a need for chlorinated ethylene polymers that can be used in bulk quantities, and can be shipped and stored in bulk quantities, without significant blocking, or massing of the polymer. There is a further need for chlorinated ethylene-based polymers that can be "bulk handleable" without the addition of large amounts of one or more antiblocking agents. There is also a need for chlorinated ethylene polymers that have good processibilty and dispersion in rigid PVC formulations, that result in low or no surface defects, and that provide good impact resistance in the final fabricated product. These needs and others have been met by the following invention.

SUMMARY OF THE INVENTION

The invention provides a chlorinated ethylene-based polymer comprising the following properties:
a) a percent crystallinity less than 8, as measured by DSC, using a polyethylene heat of fusion of 290 Joules per gram, and
b) a crystallization temperature, Tc, from 28° C. to 60° C., and
wherein the chlorinated ethylene-based polymer is formed from an ethylene-based polymer that has a weight average molecular weight, Mw, less than, or equal to, 325,000 g/mol.

The invention also provides a chlorinated ethylene-based polymer comprising the following properties:
a) a percent crystallinity less than 8, as measured by DSC, using polyethylene heat of fusion of 290 Joules per gram, and
b) a crystallization temperature, Tc, from 25° C. to 80° C., and wherein the chlorinated ethylene polymer is formed from an ethylene-based polymer that has a weight average molecular weight, Mw, less than, or equal to, 325,000 g/mole and greater than 150,000 g/mole.

The invention provides a process for preparing a chlorinated ethylene-based polymer, said process comprising:
chlorinating a ethylene-based polymer in an aqueous slurry reaction mixture, and
wherein the temperature of the reaction mixture is first increased from a lower temperature T1 to a higher temperature T2, and
wherein, subsequently, the temperature of the reaction mixture is increased to a temperature T3, wherein T3≧T2, and held at temperature T3 for a time, t; and
wherein 60 weight percent or more of the total amount of chlorine added to the reaction mixture, is added during the period when the temperature of the reaction mixture is increased from T1 to T2, and
wherein 40 weight percent or less of the total amount of chlorine added to the reaction mixture, is added during time t; and
wherein temperature T1 is from 50° C. to 100° C., and temperature T2 is from 100° C. to 120° C., and T3 is greater than 110° C.; and
wherein the ethylene-based polymer has a weight average molecular weight, Mw, less than 350,000 g/mole.

The invention further provides a process for preparing a chlorinated ethylene-based polymer, said process comprising:
chlorinating an ethylene-based polymer in an aqueous slurry reaction mixture, and
wherein the temperature of the reaction mixture is first increased from a lower temperature T1 to a higher temperature T2, and
wherein, subsequently, the temperature of the reaction mixture is increased to a temperature T3, wherein T3≧T2; and wherein 60 weight percent or more of the total amount of chlorine added to the reaction mixture, is added during the period when the temperature of the reaction mixture is increased from T1 to T2, and
wherein temperature T1 is from 90° C. to 110° C., and temperature T2 is from T1 to 135° C., and T3 is greater than 110° C. and less than the melting temperature (Tm) of the ethylene-based polymer; and
wherein the ethylene-based polymer has a weight average molecular weight, Mw, less than 350,000 g/mole and greater than 150,000 g/mole.

Articles comprising at least one component formed from an inventive chlorinated ethylene-based polymer, or composition comprising the same, are also provided.

DETAILED DESCRIPTION OF THE INVENTION

Applicants have found that a controlled chlorine addition onto a ethylene-based polymer produces a relatively high modulus CPE, with enough residual crystallinity to lower the blocking tendency of the CPE, such that the CPE is bulk handleable. In addition, the controlled incorporation of chlorine onto a medium molecular weight ethylene-based polymer provides a material of proper viscosity, which, when formulated into PVC, results in a finished PVC compound part, with less surface defects.

Some commercially randomly chlorinated polyethylenes have low crystallization temperatures that hinder bulk handlebility, while others have too high a molecular weight, which hinders processibility, such as, when in compositions for the extrusion of profiles with minimal surface defects. The medium molecular weight CPE has long been used with extra antiblock for customers that want bulk handleability. High molecular weight grades of CPE were developed for bulk handleability, but were found to have poor PVC processability, resulting in surface defects, such as specks observed on the surface of the product. Thus, using a medium molecular weight ethylene based polymer in a controlled process for incorporating the chlorine onto the backbone of such a polymer, allows for an unexpected improvement in both the bulk handleability of the resultant chlorinated polymer, and in the processibility of vinyl chloride polymer formulations, containing such a chlorinated polymer. The polymer molecular weight must still be high enough to provide melt strength for molded parts as well as impact strength. The inventive CPE is particularly suited for rigid PVC formulations used to form window profiles.

The invention provides a chlorinated ethylene-based polymer with low blocking tendency. As discussed above, when a medium molecular weight ethylene-based polymer is chlorinated in a controlled manner, as discussed herein, a medium molecular weight chlorinated ethylene polymer is produced that is "bulk handeable," and can be used in PVC formulations with good processibility, and reduced surface defects. These excellent properties predominantly result from the correct selection of molecular weight of the ethylene based polymer and by the controlled incorporation of chlorine onto the polymer during the chlorine addition reaction. The controlled chlorination leaves a crystallinity, which melts between 25° C. and 100° C., and preferably between 28° C. and 80° C., and more preferably between 30° C. and 60° C. This residual crystallinity causes the polymer to resist particle-to-particle deformation and cold flow, without harming other rubber properties, such as impact resistance. Such a process yields chlorinated polyethylene polymer with a relatively high tensile stress at 100 percent elongation (100 percent modulus) and sufficiently high crystallization temperature (Tc, as measured by DSC).

Overview

As discussed above, the invention provides a chlorinated ethylene-based polymer comprising the following properties:

a) a percent crystallinity less than 8, as measured by DSC, using a polyethylene heat of fusion of 290 Joules per gram, and b) a crystallization temperature, Tc, from 28° C. to 60° C., and wherein the chlorinated ethylene-based polymer is formed from an ethylene-based polymer that has a weight average molecular weight, Mw, less than, or equal to, 325,000 g/mol.

In one embodiment, the ethylene-based polymer has a weight average molecular weight less than, or equal to, 300,000 g/mole.

In another embodiment, the ethylene-based polymer has a weight average molecular weight greater than 150,000 g/mole.

In another embodiment, the ethylene-based polymer has a weight average molecular weight greater than, or equal to, 175,000 g/mole.

In another embodiment, the ethylene-based polymer has a weight average molecular weight, Mw, less than 325,000 g/mole and greater than 175,000 g/mole.

In a preferred embodiment, the ethylene-based polymer is an HDPE.

In another embodiment, the chlorinated ethylene-based polymer has a percent crystallinity less than 5, or less than 2.

In another embodiment the chlorinated ethylene-based polymer has a crystallization temperature, Tc, from 28° C. to 50° C.

In another embodiment the chlorinated ethylene-based polymer has a crystallization temperature, Tc, from 28° C. to 40° C.

In another embodiment the chlorinated ethylene-based polymer has a crystallization temperature, Tc, from 30° C. to 60° C.

In another embodiment, the chlorinated ethylene-based polymer has a crystallization temperature of greater than 28° C., preferably greater than 30° C.

In another embodiment, the chlorinated ethylene-based polymer has a crystallization temperature of less than 50° C., or less than 40° C.

In another embodiment, the chlorinated ethylene-based polymer contains from 20 to 50 weight percent chlorine, based on the total weight of polymer, and preferably from 20 to 45 or 25 to 45 weight percent chlorine, based on the total weight of polymer.

In another embodiment, the chlorinated ethylene-based polymer has a "100 percent modulus" value greater than 1.05 N/mm$^2$, preferably greater than 1.15 N/mm$^2$, more preferably greater than 1.25 N/mm$^2$, and even more preferably greater than 1.35 N/mm$^2$.

In another embodiment, the chlorinated ethylene-based polymer has a "100 percent modulus" value greater than 1.05 N/mm$^2$, preferably greater than 1.15 N/mm$^2$, more preferably greater than 1.25 N/mm$^2$, and even more preferably greater than 1.35 N/mm$^2$, and a crystallization temperature of greater than 28° C.

In another embodiment, the chlorinated ethylene-based polymer has a blocking force of 20 psi or less, and preferably 15 psi or less.

In another embodiment, a composition comprising an inventive chlorinated ethylene-based polymer, has a blocking force of 20 psi or less, and preferably 15 psi or less.

The invention also provides a chlorinated ethylene-based polymer comprising the following properties:

a) a percent crystallinity less than 8, as measured by DSC, using polyethylene heat of fusion of 290 Joules per gram, and b) a crystallization temperature, Tc, from 25° C. to 80° C., and wherein the chlorinated ethylene polymer is formed from an ethylene-based polymer that has a weight average molecular weight, Mw, less than, or equal to, 325,000 g/mole and greater than 150,000 g/mole.

In another embodiment, the ethylene-based polymer has a weight average molecular weight less than, or equal to, 300,000 g/mole.

In another embodiment, the ethylene-based polymer has a weight average molecular weight greater than 175,000 g/mole.

In another embodiment, the ethylene-based polymer has a weight average molecular weight, Mw, less than 325,000 g/mole and greater than 175,000 g/mole.

In a preferred embodiment, the ethylene-based polymer is an HDPE.

In another embodiment, the chlorinated ethylene-based polymer has a percent crystallinity less than 5, or less than 2.

In another embodiment the chlorinated ethylene-based polymer has a crystallization temperature, Tc, from 25° C. to 60° C.

In another embodiment the chlorinated ethylene-based polymer has a crystallization temperature, Tc, from 25° C. to 50° C.

In another embodiment the chlorinated ethylene-based polymer has a crystallization temperature, Tc, from 25° C. to 40° C.

In another embodiment, the chlorinated ethylene-based polymer has a "100 percent modulus" value greater than 1.05 N/mm², preferably greater than 1.15 N/mm², more preferably greater than 1.25 N/mm², and even more preferably greater than 1.35 N/mm².

In another embodiment, the chlorinated ethylene-based polymer has a "100 percent modulus" value greater than 1.05 N/mm², preferably greater than 1.15 N/mm², more preferably greater than 1.25 N/mm², and even more preferably greater than 1.35 N/mm², and a crystallization temperature of greater than 28° C.

In another embodiment, the chlorinated ethylene-based polymer has a blocking force of 20 psi or less, and preferably 15 psi or less.

In another embodiment, the chlorinated ethylene-based polymer has a crystallization temperature of greater than 25° C., preferably greater than 28° C., and more preferably greater than 30° C.

In another embodiment, the chlorinated ethylene-based polymer has a crystallization temperature of less than 70° C., or less than 60° C., or less than 50° C.

In another embodiment, the chlorinated ethylene-based polymer contains from 20 to 50 weight percent chlorine, based on the total weight of polymer, and preferably from 20 to 45 or 25 to 45 weight percent chlorine, based on the total weight of polymer.

In another embodiment, the chlorinated ethylene-based polymer has a "100 percent modulus" value greater than 1.05 N/mm², preferably greater than 1.15 N/mm², more preferably greater than 1.25 N/mm², and even more preferably greater than 1.35 N/mm².

In another embodiment, the chlorinated ethylene-based polymer has a "100 percent modulus" value greater than 1.05 N/mm², preferably greater than 1.15 N/mm², more preferably greater than 1.25 N/mm², and even more preferably greater than 1.35 N/mm², and a crystallization temperature of greater than 28° C.

In another embodiment, the chlorinated ethylene-based polymer has a blocking force of 20 psi or less, and preferably 15 psi or less.

In another embodiment, a composition comprising an inventive chlorinated ethylene-based polymer, has a blocking force of 20 psi or less, and preferably 15 psi or less.

The invention also provides a composition comprising an inventive chlorinated ethylene-based polymer as described herein.

In another embodiment, the composition further comprises an ethylene/alpha-olefin interpolymer.

In another embodiment, the composition further comprises an acrylic polymer.

In another embodiment, the composition further comprises a vinyl chloride polymer.

In another embodiment, the composition further comprises an ethylene/alpha-olefin interpolymer and a vinyl chloride polymer.

In another embodiment, the composition further comprises an acrylic polymer and a vinyl chloride polymer.

In another embodiment, the composition further comprises one or more additional antiblocks. Antiblocks include, but are not limited to, talc, calcium stearate, and calcium carbonate.

In another embodiment, the chlorinated ethylene-based polymer contains up to 6 weight percent of one or more additional antiblocks. Antiblocks include, but are not limited to, talc, calcium stearate, and calcium carbonate.

The invention also provides an article comprising at least one component formed from an inventive chlorinated ethylene polymer as described herein.

The invention also provides an article comprising at least one component formed from an inventive composition as described herein.

In another embodiment of the invention, the article, or component, is formed by an extrusion process. In a further embodiment, the article is an extrusion profile. In yet a further embodiment, the extrusion profile has ten or less, and preferably five or less, surface defects per six meters of profile.

In another embodiment, the article, or component, is formed by an injection molding process, a compression molding process, or a thermoforming process.

In another embodiment, the article is selected from the group consisting of siding, pipes, tubing, window profiles, fencing, decking and electrical conduits.

The invention also provides a process for preparing a chlorinated ethylene-based polymer, said process comprising:

chlorinating a ethylene-based polymer in an aqueous slurry reaction mixture, and wherein the temperature of the reaction mixture is first increased from a lower temperature T1 to a higher temperature T2, and wherein, subsequently, the temperature of the reaction mixture is increased to a temperature T3, wherein $T3 \geq T2$, and held at temperature T3 for a time, t; and wherein 60 weight percent or more, preferably 70 weight percent or more, of the total amount of chlorine added to the reaction mixture, is added during the period when the temperature of the reaction mixture is increased from T1 to T2, and wherein 40 weight percent or less, preferably 30 weight percent or less, of the total amount of chlorine added to the reaction mixture, is added during time t; and wherein temperature T1 is from 50° C. to 100° C., and temperature T2 is from 100° C. to 120° C., and T3 is greater than 110° C.; and wherein the ethylene-based polymer has a weight average molecular weight, Mw, less than 350,000 g/mole.

In another embodiment, the ethylene-based polymer has a weight average molecular weight, Mw, less than 340,000 g/mole.

In another embodiment, the ethylene-based polymer has a weight average molecular weight, Mw, less than 325,000 g/mole.

In one embodiment, the ethylene-based polymer has a weight average molecular weight less than, or equal to, 300,000 g/mole.

In another embodiment, the ethylene-based polymer has a weight average molecular weight greater than 150,000 g/mole.

In another embodiment, the ethylene-based polymer has a weight average molecular weight greater than, or equal to, 175,000 g/mole.

In another embodiment, the ethylene-based polymer has a weight average molecular weight, Mw, less than 325,000 g/mole and greater than 175,000 g/mole.

In a preferred embodiment, the ethylene-based polymer is an HDPE.

In another embodiment, from 60 to 80 weight percent of the total amount of chlorine added to the reaction mixture, is added during the period when the temperature of the reaction mixture is increased from T1 to T2, and wherein from 20 to 40 weight percent of the total amount of chlorine added to the reaction mixture, is added during time t.

The Tm (base polymer) is the peak melting temperature of the ethylene-based polymer, as determined by DSC, as described herein.

In a further embodiment, time, t, is a time sufficient for the chlorine to react, for example, as determined by the chlorine feed rate (instantaneous reaction) or total chlorine addition (mass balance). In another embodiment, t is at least 5 minutes.

In another embodiment, from 70 to 80 weight percent of the total amount of chlorine added to the reaction mixture, is added during the period when the temperature of the reaction mixture is increased from T1 to T2, and wherein from 20 to 30 weight percent of the total amount of chlorine added to the reaction mixture, is added during time t.

In a further embodiment, time, t, is a time sufficient for the chlorine to react, for example, as determined by the chlorine feed rate (instantaneous reaction) or total chlorine addition (mass balance). In another embodiment, t is at least 5 minutes.

The invention also provides a process for preparing a chlorinated ethylene-based polymer, said process comprising:

chlorinating an ethylene-based polymer in an aqueous slurry reaction mixture, and wherein the temperature of the reaction mixture is first increased from a lower temperature T1 to a higher temperature T2, and wherein, subsequently, the temperature of the reaction mixture is increased to a temperature T3, wherein $T3 \geq T2$; and wherein 60 weight percent or more, preferably 70 weight percent or more, of the total amount of chlorine added to the reaction mixture, is added during the period when the temperature of the reaction mixture is increased from T1 to T2, and wherein temperature T1 is from 90° C. to 110° C., and temperature T2 is from T1 to 135° C., and T3 is greater than 110° C. and less than the melting temperature (Tm) of the ethylene-based polymer; and wherein the ethylene-based polymer has a weight average molecular weight, Mw, less than 350,000 g/mole and greater than 150,000 g/mole.

The melting temperature, Tm, is the peak melting temperature of the ethylene-based polymer, as determined by DSC, as described herein.

In another embodiment, the ethylene-based polymer has a weight average molecular weight, Mw, less than 340,000 g/mole.

In another embodiment, the ethylene-based polymer has a weight average molecular weight, Mw, less than 325,000 g/mole.

In one embodiment, the ethylene-based polymer has a weight average molecular weight less than, or equal to, 300,000 g/mole.

In another embodiment, the ethylene-based polymer has a weight average molecular weight greater than 150,000 g/mole.

In another embodiment, the ethylene-based polymer has a weight average molecular weight greater than, or equal to, 175,000 g/mole.

In another embodiment, the ethylene-based polymer has a weight average molecular weight, Mw, less than 325,000 g/mole and greater than 175,000 g/mole.

In a preferred embodiment, the ethylene-based polymer is an HDPE.

In another embodiment, 70 weight percent or more of the total amount of chlorine added to the reaction mixture, is added during the period when the temperature of the reaction mixture is increased from T1 to T2.

In another embodiment, from 60 to 90 weight percent of the total amount of chlorine added to the reaction mixture, is added during the period when the temperature of the reaction mixture is increased from T1 to T2

In another embodiment, from 70 to 80 weight percent of the total amount of chlorine added to the reaction mixture, is added during the period when the temperature of the reaction mixture is increased from T1 to T2.

The invention also provides a chlorinated ethylene-based polymer formed from an inventive process as described herein.

A chlorinated ethylene-based polymer of the invention may comprise a combination of two or more embodiments as described herein.

A composition of the invention may comprise a combination of two or more embodiments as described herein.

An article of the invention may comprise a combination of two or more embodiments as described herein.

A process of the invention may comprise a combination of two or more embodiments as described herein.

Chlorinated Ethylene Based Polymer

A particular feature of the chlorinated ethylene-based polymers of the present invention is that such polymers are formed from medium molecular weight ethylene-based polymers, which are reacted with chlorine in a controlled manner to form a polymer of sufficient modulus and crystallization temperature to adequately resist particle-to-particle deformation and cold-flow. It is postulated that the controlled addition of chlorine yields a specialized, blocky (or pseudo blocky) chlorine distribution, in which relatively small crystallizable segments of non-chlorinated regions remain in the final polymer. This selective chlorinated distribution provides an increase in the amount of low temperature crystallinity in the chlorinated polymer.

The ethylene-based polymer can be an ethylene homopolymer or an ethylene/α-olefin interpolymer. In a preferred embodiment, the ethylene based polymer is an ethylene homopolymer, and preferably a HDPE (High Density Polyethylene).

In another embodiment, the ethylene-based polymer has a density greater than, or equal to, 0.930 g/cc, preferably greater than, or equal to, 0.940 g/cc, and more preferably greater than, or equal to, 0.950 g/cc. In a preferred embodiment the ethylene based polymer is an ethylene homopolymer with a density greater than 0.940 g/cc.

In another embodiment, the ethylene-based polymer has a density greater than, or equal to, 0.955 g/cc, preferably greater than, or equal to, 0.956 g/cc. In a preferred embodiment the ethylene based polymer is an ethylene homopolymer, and preferably a HDPE.

In another embodiment, the ethylene-based polymer has a density less than, or equal to, 0.965 g/cc, preferably less than, or equal to, 0.960 g/cc. In a preferred embodiment the ethylene based polymer is an ethylene homopolymer, and preferably a HDPE.

In another embodiment, the ethylene-based polymer has a weight average molecular weight less than 350,000 g/mole, preferably less than, or equal to, 325,000 g/mole, and more preferably less than, or equal to, 300,000 g/mole. In another embodiment, the ethylene based polymer has a weight average molecular weight from 200,000 g/mole to 340,000 g/mole, including all individual values and subranges therebetween. In a preferred embodiment the ethylene based polymer is an ethylene homopolymer, and preferably a HDPE.

In another embodiment, the ethylene-based polymer has a weight average molecular weight greater than 150,000 g/mole, preferably greater than, or equal to, 165,000 g/mole, and more preferably greater than, or equal to, 175,000 g/mole. In another embodiment, the ethylene based polymer has a weight average molecular weight from greater than 150,000 g/mole to 325,000 g/mole, including all individual values and subranges therebetween. In a preferred embodiment the ethylene based polymer is an ethylene homopolymer, and preferably a HDPE.

In another embodiment, the ethylene-based polymer has a melt index (I10) less than, or equal to, 5 g/10 min, preferably less than, or equal to, 3 g/10 min, and more preferably less than, or equal to, 2 g/10 min. In a preferred embodiment the ethylene based polymer is an ethylene homopolymer, and preferably a HDPE.

In another embodiment, the ethylene-based polymer has a melt index (I10) greater than, or equal to, 0.8 g/10 min, preferably greater than, or equal to, 0.9 g/10 min, and more preferably greater than, or equal to, 1 g/10 min. In a preferred embodiment the ethylene based polymer is an ethylene homopolymer, and preferably a HDPE.

In another embodiment, the melting point (Tm) of the ethylene-base polymer is greater than, or equal to, 110° C., preferably greater than, or equal to 120° C., and more preferably greater than, or equal to 130° C., as determined by DSC.

The ethylene/α-olefin interpolymers may be produced using any conventional ethylene/α-olefin polymerization technology generally known in the art. For example, polymerization of the ethylene/α-olefin interpolymer may be accomplished at conditions well known in the art for Ziegler-Natta or Kaminsky-Sinn type polymerization reactions. The ethylene/α-olefin interpolymer may also be made using a mono- or bis-cyclopentadienyl, indenyl, or fluorenyl transition metal (preferably Group 4) catalysts or constrained geometry catalysts. Suspension, solution, slurry, gas phase, solid-state powder polymerization, or other process conditions may be employed if desired. A support, such as silica, alumina, or a polymer (such as polytetrafluoroethylene or a polyolefin) may also be employed if desired.

Ethylene may also be polymerized with at least one ethylenically unsaturated monomer, selected from the group consisting of C3-C12 alpha-olefins, C1-C12 alkyl esters of C3-C20 monocarboxylic acids; unsaturated C3-C20 mono- or dicarboxylic acids; anhydrides of unsaturated C4-C8 dicarboxylic acids; and vinyl esters of saturated C2-C18 carboxylic acids.

The chlorinated ethylene-based polymers may be prepared from ethylene-based interpolymers that are branched or unbranched. The ethylene-based polymers may be prepared by free radical processes, Ziegler-Natta catalyst systems, such as the improved methodology presented in U.S. Pat. Nos. 4,661,465 and 4,873,300, metallocene catalyst systems, and/or constrained geometry catalyst systems, such as those disclosed in U.S. Pat. Nos. 5,272,236 and 5,278,272; each incorporated herein, in its entirety, by reference.

In one embodiment, the chlorinated ethylene-based polymer is prepared from a heterogeneously branched ethylene-based interpolymer.

In another embodiment, the chlorinated ethylene-based polymer is prepared from a homogeneously branched linear ethylene-based interpolymer.

In another embodiment, the chlorinated ethylene-based polymer is prepared from a homogeneously branched substantially linear ethylene-based interpolymer.

In a preferred embodiment, the chlorinated ethylene-based polymer is prepared from a ethylene homopolymer, which is prepared from a Ziegler-Natta catalyst system, such as the improved methodology presented in U.S. Pat. Nos. 4,661,465 and 4,873,300.

Inert liquids serve as suitable solvents for polymerization of the ethylene-base polymer. Examples include straight and branched-chain hydrocarbons, such as isobutane, butane, pentane, hexane, heptane, octane, and mixtures thereof; cyclic and alicyclic hydrocarbons such as cyclohexane, cycloheptane, methylcyclohexane, methylcycloheptane, and mixtures thereof; perfluorinated hydrocarbons, such as perfluorinated C4-10 alkanes; and aromatic and alkyl-substituted aromatic compounds, such as benzene, toluene, xylene, and ethylbenzene. Suitable solvents also include liquid olefins that may act as monomers or comonomers, including butadiene, cyclopentene, 1-hexene, 4-vinylcyclohexene, vinylcyclohexane, 3-methyl-1-pentene, 4-methyl-1-pentene, 1,4-hexadiene, 1-octene, 1-decene, styrene, divinylbenzene, allylbenzene, and vinyltoluene (including all isomers alone or in admixture). Mixtures of the foregoing are also suitable. If desired, normally gaseous olefins can be converted to liquids by application of pressure, and used in the polymerization.

Representative chlorinated olefin polymers include the following: a) chlorinated and chlorosulfonated homopolymers of ethylene and b) chlorinated and chlorosulfonated copolymers of ethylene and at least one ethylenically unsaturated monomer selected from the group consisting of C3-C10 alpha monoolefins; C1-C12 alkyl esters of C3-C20 monocarboxylic acids; unsaturated C3-C20 mono- or dicarboxylic acids; anhydrides of unsaturated C4-C8 dicarboxylic acids; and vinyl esters of saturated C2-C18 carboxylic acids. Chlorinated and chlorosulfonated graft copolymers are included as well.

Some examples of suitable polymers include chlorinated polyethylene; chlorosulfonated polyethylene; chlorinated ethylene acrylic acid copolymers; chlorosulfonated ethylene acrylic acid copolymers; chlorinated ethylene methacrylic acid copolymers; chlorosulfonated ethylene methacrylic acid copolymers; chlorinated ethylene methyl acrylate copolymers; chlorinated ethylene methyl methacrylate copolymers; chlorinated ethylene n-butyl methacrylate copolymers; chlorinated ethylene glycidyl methacrylate copolymers; chlorinated graft copolymers of ethylene and maleic acid anhydride; chlorinated copolymers of ethylene with propylene, butene, 3-methyl-1-pentene, or octene and chlorosulfonated copolymers of ethylene with propylene, butene, 3-methyl-1-pentene or octene. The copolymers may be dipolymers, terpolymers, or higher order copolymers. Chlorinated olefin polymers typically include chlorinated polyethylene.

In one embodiment, the amount of chlorination, based on the weight of the chlorinated ethylene-based polymer, is greater than, or equal to, 28 weight percent, preferably greater than, or equal to, 30 weight percent, and more preferably greater than, or equal to, 33 weight percent, based on the total weight of chlorinated polymer. In a preferred embodiment the ethylene based polymer is an ethylene homopolymer, and preferably a HDPE.

In another embodiment, the amount of chlorination, based on the weight of the chlorinated ethylene-based polymer, is less than, or equal to, 45 weight percent, preferably less than, or equal to, 42 weight percent, and more preferably less than, or equal to, 40 weight percent, based on the total weight of chlorinated polymer. In a preferred embodiment the ethylene based polymer is an ethylene homopolymer, and preferably a HDPE.

A chlorinated ethylene-based polymer may have a combination of two or more suitable embodiments as described herein.

An ethylene-based polymer may have a combination of two or more suitable embodiments as described herein.

Chlorination Reaction

Chlorination or chlorosulfonation of the ethylene based polymers may take place in suspension, solution, solid state or fluidized bed. Free radical suspension chlorination processes are described and taught in U.S. Pat. Nos. 3,454,544, 4,767,823, incorporated herein by reference, and references cited therein. Such processes involve preparation of an aqueous suspension of a finely divided ethylene polymer that is then chlorinated. Chlorosulfonation processes are conventionally performed in solution, but suspension and non-solvent processes are also known. Preparations of chlorosulfonated olefin polymers are described in U.S. Pat. Nos. 2,586,363; 3,296,222; and 5,242,987; each incorporated herein, in its entirety, by reference.

In the suspension chlorination reaction, the reactor temperature can be increased to a temperature high enough to destroy the residual crystallinity in the ethylene-based polymer. Typically, for the random chlorination of polyethylene, the reaction temperature is increased to a temperature within several degrees of the melting point of the ethylene-based polymer to form a non-crystalline, amorphous polymer that can participate in the chlorination reaction. However, by controlling the amount of chlorine available to react with the available amorphous polymer fraction, and by controlling the molecular weight of the ethylene-base polymer, it has been found that the chlorine distribution, and hence the polymer's viscosity, 100 percent modulus, and crystallization temperature, can all be controlled.

In a preferred embodiment, the ethylene based polymer is chlorinated by an aqueous slurry process in an enclosed, agitated vessel. For purposes of process control, the polymer may be premixed with a particle size control aid, such as talc, in water. Additional particle size control aid may also be added during chlorination. The slurry may also contain a surfactant.

In one embodiment of the invention, a process control aid (such as talc), a surfactant (for example, a polyethylene glycol ester) and water are charged to a reactor, where the mixture is heated from ambient temperature (approximately 27° C.) to a prescribed starting temperature. In one embodiment, the chlorine addition starts when the slurry temperature reaches the prescribed temperature (T1). The controlled gaseous chlorine addition proceeds until a temperature T2, equal to the maximum temperature (T3), sufficient to disrupt the base polyethylene crystallinity, is reached. During this ramp in temperature, a controlled amount of chlorine is added to the reactor to achieve the desired product total chlorine content and chlorine distribution. After the chlorine addition has been completed, the reaction mixture is cooled to a lower temperature, typically about 90° C. The reaction mixture is then transferred into another agitated vessel. After sufficient washing of the residual HCl from the particles, the slurry is cooled, and then dewatered by a centrifuge. Each batch of the CPE cake is dried and blended with up to an additional 6 wt percent (dry basis) antiblock, which could include talc, calcium stearate, calcium carbonate, or other suitable antiblock agent, Blending may take place in a batch fluid bed dryer.

In another embodiment, the temperature of the reaction mixture is first increased from a lower temperature T1 to a higher temperature T2, and wherein, subsequently, the temperature of the reaction mixture is increased to a temperature T3, wherein T3≧T2, and held at temperature T3 for a time, t; and wherein 60 weight percent or more of the total amount of chlorine added to the reaction mixture, is added during the period when the temperature of the reaction mixture is increased from T1 to T2, and wherein 40 weight percent or less of the total amount of chlorine added to the reaction mixture, is added during time t; and wherein temperature T1 is from 50° C. to 100° C., and temperature T2 is from 100° C. to 120° C., preferably from 100° C. to 110° C., and T3 is greater than 110° C., and preferably T3>{Tm (base polymer)−10° C.}. The Tm (base polymer) is the peak melting temperature of the ethylene-based polymer, as determined by DSC, as described herein. In a further embodiment, 60 weight percent or more of the total amount of chlorine added to the reaction mixture, is added during the period when the temperature of the reaction mixture is increased from T1 to T2. In another embodiment, 70 weight percent or more of the total amount of chlorine added to the reaction mixture, is added during the period when the temperature of the reaction mixture is increased from T1 to T2. In another embodiment, time, t, is a time sufficient for the chlorine to react, for example, as determined by the chlorine feed rate (instantaneous reaction) or total chlorine addition (mass balance).

In another embodiment, temperature of the reaction mixture is first increased from a lower temperature T1 to a higher temperature T2, and wherein, subsequently, the temperature of the reaction mixture is increased to a temperature T3, wherein T3≧T2; and wherein 50 weight percent or more of the total amount of chlorine added to the reaction mixture, is added during the period when the temperature of the reaction mixture is increased from T1 to T2, and wherein temperature T1 is from 90° C. to 110° C., and temperature T2 is from T1 to 135° C., and T3 is greater than 110° C. and less than the melting temperature (Tm) of the ethylene-based polymer. The melting temperature, Tm, is the peak melting temperature of the ethylene-based polymer, as determined by DSC, as described herein. In a further embodiment, 60 weight percent or more of the total amount of chlorine added to the reaction mixture, is added during the period when the temperature of the reaction mixture is increased from T1 to T2. In another embodiment, 70 weight percent or more of the total amount of chlorine added to the reaction mixture, is added during the period when the temperature of the reaction mixture is increased from T1 to T2. In another embodiment, T2 is from T1 to 120 C. In another embodiment, T2 is from T1 to 110 C.

In another embodiment, 100 weight percent of the total chlorine is added to the reactor during a temperature ramp to a peak reactor temperature (t=0, and ramp from T1 to T3) within several degrees (for example, 2-5 degrees C.) below of the base polymer peak melting point.

In another embodiment, the chlorination reaction is lined out (or held) at a temperature (T3) greater than 110° C., and preferably at a temperature greater than 120° C. In a further embodiment, the reaction temperature is held at a temperature greater than 110° C. for a time sufficient for the chlorine to react (for example, at least 5 minutes). In yet a further embodiment, the reaction temperature is held at a temperature greater than 120° C. for a time sufficient for the chlorine to react (for example, at least 5 minutes).

In another embodiment, for each process described herein, greater than 65 weight percent, and more preferably greater than 70 weight percent, of the total chlorine added to the reactor, is added during the temperature ramp (T1 to T2 or T3).

In another embodiment, less than 35 weight percent, and preferably less than 30 weight percent of the total chlorine added to the reactor, is added during the reaction line out.

In another embodiment, for each process described herein, greater than 25 weight percent of the total chlorine added to the reactor, is added before the reaction temperature reaches 110° C. (T2).

In another embodiment, the chlorination reaction does not contain a free radical source, and/or a catalyst.

In another embodiment, the chlorination reaction is not activated by UV radiation.

The inventive process may contain a combination of two or more suitable embodiments as described herein.

Impact Modifier

The impact modifier comprises an inventive chlorinated ethylene polymer, as described herein. The impact modifier may also contain a hydrocarbon-based polymer, such as an acrylic polymer or an ethylene/α-olefin interpolymer. The impact modifier may also contain one or more antiblock agents, such as talc, calcium stearate, calcium carbonated, or other suitable agents. Antiblock agents are generally in the range of 2-20 weight percent based on the total impact modifier. Preferably, antiblock agents are in the range of 2-10 weight percent. More preferably, antiblock agents are in the range of 2-6 weight percent.

Impact Modified Vinyl Chloride Polymer Composition

The impact modified compositions of the present invention comprise a vinyl chloride polymer, and an impact modifier, which comprises an inventive chlorinated ethylene polymer, as described herein. The composition may also comprise one or 1 5 more additional additives, such as fillers and/or pigments, and other impact modifiers, such as acrylic impact modifier, acrylonitrile-butadiene-styrene (ABS) impact modifier, and/or methacrylate-butadiene-styrene (MBS) impact modifiers.

In one embodiment, the vinyl chloride polymer composition comprises 2-20 parts by weight of the impact modifier per hundred parts by weight of vinyl chloride polymer, and preferably 4-10 parts by weight of the impact modifier per hundred parts by weight of vinyl chloride polymer.

The vinyl chloride polymer component is typically a solid, high molecular weight polymer, which may be a polyvinyl chloride homopolymer or a copolymer of vinyl chloride having copolymerized or grafted units of one or more additional comonomers. When present, such comonomers will typically account for up to 20 weight percent of the copolymer, and preferably from 1 to 5 weight percent of the copolymer. Examples of suitable comonomers include C2-C6 olefins, for example butyl-acrylate copolymers; ethylene and propylene; vinyl esters of straight chain or branched C2-C4 carboxylic acids, such as vinyl acetate, vinyl propionate, and vinyl 2-ethyl hexanoate; vinyl halides, for example vinyl fluoride, vinylidene fluoride or vinylidene chloride; vinyl ethers, such as vinyl methyl ether and butyl vinyl ether; vinyl pyridine; unsaturated acids, for example maleic acid, fumaric acid, methacrylic acid and their mono- or diesters with C1-C10 mono- or dialcohols; maleic anhydride, maleic acid imide as well as the N-substitution products of maleic acid imide with aromatic, cycloaliphatic and optionally branched aliphatic substituents; acrylonitrile and styrene. Such homopolymers and copolymers are commercially available from Formosa and Shintech.

The vinyl chloride polymer component may be prepared by any suitable polymerization methods, including, but not limited to, mass, suspension, dispersion, and emulsion processes. Polymers prepared using a suspension process are preferred.

Graft copolymers of vinyl chloride are also suitable for use in the invention. For example, ethylene copolymers, such as ethylene vinyl acetate, and ethylene copolymer elastomers, such as EPDM (copolymers comprising copolymerized units of ethylene, propylene and dienes) and EPR (copolymers comprising copolymerized units of ethylene and propylene) that are grafted with vinyl chloride may be used as the vinyl chloride polymer component. A commercially available example of such a polymer is Vinnol® 500, available from Wacker Chemie GmbH.

The vinyl chloride polymer compositions of the present invention are typically physical blends of polymers, and do not require crosslinking or vulcanization in order to be useful as commercial products. Fillers are generally used in amounts of 2 to 50 parts per hundred parts vinyl chloride polymer. Preferably the impact resistant composition contains 5 to 35 parts per hundred of filler relative to the vinyl chloride polymer. Particularly useful fillers include silica, clay, titanium dioxide, talc, calcium carbonate, and other mineral fillers. Calcium carbonate is preferred. The compositions can additionally contain other compounding ingredients, such as other impact modifiers, stabilizers, blowing agents, lubricants, pigments, colorants, process aids, plasticizers, crosslinking agents. The use of such additional components permits the compositions to be tailored for use in various applications, for example rigid PVC siding, pipe and profiles, such as windows, fencing, decking and electrical conduit, and other applications.

Particularly useful compounding ingredients include tin, lead and calcium/zinc stabilizers, polymethylmethacrylate process aids, and hydrocarbon, ester, or amide waxes. If compounding ingredients are utilized, they are generally used in amounts of from 0.1 to 50, and preferably 0.1 to 30, parts per hundred parts vinyl chloride resin, depending on the type of additive. The impact resistant compositions of the present invention are particularly useful in the manufacture of PVC siding, profiles, and pipes. Preferably, the impact resistant rigid vinyl chloride polymer composition may comprise from 0.1 to 25 parts by weight of the additional components per 100 parts by weight of vinyl chloride polymer.

Conventional chlorinated polyethylene may contain about 12 weight percent calcium carbonate filler, which is used to reduce the blocking tendency of the chlorinated polyolefin, such as a chlorinated ethylene-base polymer. This requires an additional step to make the blend, which is a cost penalty, and which introduces calcium carbonate, which may not be desired in the final vinyl chloride polymer formulation. The addition of large amounts of antiblock agents can also lead to de-mixing and segregation of the individual components during transportation and/or conveying of the material.

In production, the vinyl chloride polymer and the impact modifier are blended together, thereby forming the impact resistant rigid vinyl chloride polymer composition. Blending may be facilitated via any method generally known in the art; for example, blending may be facilitated via a high-intensity dry blend mixer, a compounding extruder, a tumble blender, a ribbon mixer, a Banbury type mixer, or any other mixing equipment.

Typical end use applications for the impact modified vinyl chloride polymer compositions include, but are not limited to, sheets, window profiles, fences, siding panels, decks, and pipes. Generally known methods, including, but not limited to, extrusion, injection molding, compression molding may be employed to form articles, such as sheets, window profiles, fences, siding panels, decks, pipes, tubes and electrical conduits.

Additional articles, each having at least one component formed from an inventive chlorinated ethylene-based polymer, of from a composition containing the same, include, but are not limited to, an a carpet component, a wire sheath, a cable, a protective apparel, an automotive part, a footwear component, or a foam laminate, an awning, a tarp, a roofing construction article, a consumer durable, a grip, a handle, a computer component, a belt, an appliqué, a conveyor or timing belt, artificial leather, artificial turf, or a fabric.

Other articles, each having at least one component formed from an inventive chlorinated ethylene-based polymer, of from a composition containing the same, include, but are not limited to, molded article, an injection molded article, an over-molded article, a laminated structure, an extruded sheet, and a thermoformed sheet.

Definitions

Any numerical range recited herein, includes all values from the lower value and the upper value, in increments of one unit, provided that there is a separation of at least two units between any lower value and any higher value. As an example, if it is stated that a compositional, physical or other property, such as, for example, molecular weight, melt index, etc., is from 100 to 1,000, it is intended that all individual values, such as 100, 101, 102, etc., and sub ranges, such as 100 to 144, 155 to 170, 197 to 200, etc., are expressly enumerated in this specification. For ranges containing values which are less than one, or containing fractional numbers greater than one (for example, 1.1, 1.5, etc.), one unit is considered to be 0.0001, 0.001, 0.01 or 0.1, as appropriate. For ranges containing single digit numbers less than ten (for example, 1 to 5), one unit is typically considered to be 0.1. These are only examples of what is specifically intended, and all possible combinations of numerical values between the lowest value and the highest value enumerated, are to be considered to be expressly stated in this application. Numerical ranges have been recited, as discussed herein, in reference to reaction temperatures, weight average molecular weight and other properties.

The term "composition," as used herein, includes a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer, usually employed to refer to polymers prepared from only one type of monomer, and the term interpolymer as defined hereinafter.

As discussed above, the term "interpolymer," as used herein, refers to polymers prepared by the polymerization of at least two different types of monomers. The generic term interpolymer thus includes copolymers, usually employed to refer to polymers prepared from two different types of monomers, and polymers prepared from more than two different types of monomers.

The term "ethylene-based polymer," as used herein, refers to a polymer formed from predominantly (greater than 50 mole percent) ethylene monomeric units. Mole percentage is based on the total moles of polymerizable monomers.

Test Methods

Test methods include the following:

Blocking Force

The blocking force measurement method for chlorinated polyethylene is described in U.S. Pat. No. 4,412,448, incorporated herein, in its entirety, by reference. In particular, a two-inch diameter mold was filled with forty to fifty grams of particulate chlorinated polyethylene resin. A first polytetrafluoroethylene disc and a second polytetrafluoroethylene disc were positioned above and below the resin, respectively, to prevent sticking. A thin polytetrafluoroethylene sheet is used to line the inner metal wall of the mold. The mold was placed in an oven equilibrated at 60° C., and the sample (about 40 grams) compressed for three hours, under a pressure of 60 psig. The mold was removed from the oven and allowed to cool to about 25° C., for at least 3 hours, in an ASTM-specified temperature and humidity controlled laboratory environment.

The cake was then removed from the mold, and transferred to an Instron Model 1122 tester, as described in ASTM standard D 638-03. A wedge as described in U.S. Pat. No. 4,412,448, was then lowered by the Instron tester to penetrate the cake. The wedge includes an upper rectangular section and a lower wedge-shaped triangular section, which were joined together. The leading edge of the elongated triangular section has a sharp V-shaped configuration at an angle of about 60 degrees, but may be adjusted to any desired configuration or angle. Preferably, both ends of the wedge extend to at least about the opposite edges of the cake being tested.

The rate of speed of the wedge in the Instron tester was preset to about one-half inch per minute. The force applied by the Instron tester was measured continuously, as the wedge penetrated the cake up to the break-point of the resin cake. The force required to break the cake, which is the maximum force measured, provides a measure of the tendency of the chlorinated polyethylene resin to agglomerate, and the degree to which the chlorinated polyethylene resin will agglomerate.

Gel Permeation Chromatography

The average molecular weights and molecular weight distributions for the ethylene-base polymers were determined with a gel permeation chromatographic system, consisting of a Polymer Laboratories PL-210 GPC, equipped with a single Plgel MIX-A column with guard column. The mobile phase was 1,2,4-trichloro-benzene, stabilized with 200 pm butylhydroxytoluene (BHT). The polymer (1.1-1.2 mg) as dissolved in about 1 ml of the mobile phase. The PL-210 oven temperature was controlled at 145° C. For the GPC calibration, a set of polystyrene standards with molecular weights between 7,500,000 and 580 Dalton (Polymer Labs; EasyCal Standards) was used. The resulting calibration curve was transformed with the following Mark-Houwink coefficients to produce a polyethylene calibration curve. Mark-Houwink coefficients: Polystyrene alpha=0.725, Polystyrene logK=−4.021, Polyethylene a=0.725, Polyethylene logK=−3.391. The run conditions were: flow rate=0.2 mL/min, injection volume=100 microL/min, run time=90 minutes, and injection delay=4 minutes. Number average molecular weight (Mn), weight average molecular weight (Mw) and molecular weight distribution (MWD) were each determined using software which calculates the molecular weight moments from the area under the curve. The moments (number & weight averages) of the distribution (with respect to the molecular weight) can be directly calculated as the $1^{st}$ and $2^{nd}$ moments about the origin. The first moment (number average molecular weight) is: $Mn=[Sum_i(W_{fi})]/[Sum_i(W_{fi}/M_i)]$. The second moment (weight average molecular weight) is: $Mw=[Sum_i(W_{fi}*M_i)]/[Sum_i(W_{fi})]$ where $W_f$ is the weight fraction and Mi is the molecular weight. It should be noted that since the refractometer signal is directly proportional to weight fraction. The RI signal can be directly substituted for the weight fraction. Note that the molecular weight is the molecular weight obtained from the conventional calibration curve. The molecular weight distribution (MWD) is Mw/Mn.

Polymer Chlorine Content

The polymer chlorine content was measured by thermogravimetric analyses (TGA), using a TA Instrument Model 2950 Thermogravimetric Analyzer. Using tweezers to handle sample pans, each sample pan is cleaned, dried and tared. The procedure requires the bottom of each pan to be covered by the sample (typically 15-20 mg). After the pan is positioned on the instrument platform, the analyst starts the software-controlled analyses. The chlorine analysis is configured to sweep the furnace with nitrogen, equilibrate at 50° C. for one minute, equilibrate at 110° C. for five minutes, and ramp at a 50° C./minute rate to 450° C. Then the furnace gas switches to air, and the heating continues to 750° C., and a five minute equilibration. The instrument reports the chlorine content based on a calibrated sample weight loss.

Differential Scanning Calorimetry

Differential scanning calorimetry was measured with the TA Instruments Model Q1000 Series instrument. The test procedure involves weighing about ten milligrams of polymer into a tared DSC pan on a Cahn Microbalance. Polymer sample is pre-dried to less than 0.5 weight percent (based on total weight of polymer) volatiles (as determined by TGA) before the polymer is analyzed by DSC. The lid was crimped on the pan to ensure a closed atmosphere. The sample pan was placed in a DSC cell, and cooled to −50° C. The sample was kept at this temperature for one minute, and then heated, at a rate of approximately 10° C./min, to a temperature of around 180° C. The sample was kept at this temperature for one minute. Then the sample was cooled at a rate of 10° C./min to −50° C., and kept isothermally at that temperature for one minute. The sample was next heated at a rate of 10° C./min, until complete melting (second heat; around 180° C.). Unless otherwise stated, melting point (Tm) and polymer residual HDPE crystallinity of each polymer sample were determined from the first heat curve, obtained from DSC by integrating the thermal response between 110° C.-150° C. The crystallization temperature (Tc) is measured from the first cooling curve. The Tm is the temperature measured at the peak of the endotherm, as shown on the heating curve. The Tc is the temperature measured at the peak of the exotherm, as shown on the cooling curve.

The "residual HDPE crystallinity (J/g)" refers to the crystallinity in the chlorinated polymer, as measured by DSC, at approximately the same temperature range used to measure the crystallinity in the original HDPE base polymer (crystallization peak typically in the region from 110° C. to 150° C.). The "percent crystallinity" is the weight percentage of crystallinity (or residual crystallinity) in the chlorinated polymer, excluding the weight of bound chlorine. For the purposes of calculation the heat of fusion of 100 percent crystalline polyethylene by DSC will be 290 J/g. A similar method is described in U.S. Pat. No. 6,124,406, incorporated herein, in its entirety, by reference. In this case, the polymer percent crystallinity is referenced against the 100 percent crystallinity value. An example of the percent crystallinity calculation is as follows: the enthalpy of fusion for a chlorinated ethylene-based polymer, containing 36 weight percent chlorine (based on the total weight of polymer), was measured by DSC to be $\Delta H_f$=5 Joules/gram. To correct for the chlorine incorporated into the polymer, the $\Delta H_f$ corrected=5/0.64=7.8 Joules/gram (0.64=1−0.36 (weight fraction chlorine)). The percent crystallinity referenced against a 100 percent crystallinity value becomes 7.8/290×100=2.7 percent crystallinity.

Modulus Test Method

This test procedure describes the manufacture of (modulus blanket) and the determination of comparative tensile properties of a thermoplastic polymer.

Polymer resin was formulated with 100 parts CPE, 2 parts calcium stearate, 3 parts Drapex 6.8, and 0.5 parts stearic acid, and rolled on a hot (188° C.) roll mill for 5 minutes. The blanket was then pressed, and sample sections were cut from the blanket. The dumbbell test strips were placed in a tensile tester and pulled, until sample breaks. The results were measured in mega-pascals (MPa). Tensile properties of polymers are rate, dimension and orientation sensitive. Both rate and specimen dimension were fixed. Orientation-tensile relationships are fairly well fixed by the simple expedient of preparing tensile specimens by precisely the same technique (according to ASTM D3182-89, D412-98a).

The sample preparation and testing procedures are as follows. The blanket was placed in a 60 mil frame. The sample was placed in a heated press, preheated at 188° C. for two minutes without force. The press was pressurized to 20 tons, and held at this pressure for one minute. The sample was transferred to cooling platens, pressurized to 20 tons, and allowed to cool for three minutes. The sheet, from which the specimen was cut, was placed on a clean, smooth surface. Using the ASTM D412-98a "type C die," five specimens were cut, with long dimension of the die in the cross direction of the sheet.

The cut specimens were conditioned for at least an overnight period, or 18 hours, at ASTM room temperature. Dumbbells were prepared for tensile testing per ASTM D412-98a, Method A, with Type C die. The sample dimensions were specified by Method A, Type C die. The thickness of at least 3 specimens per sample were measured and recorded. The sample was measured using an Instron 1122 tensile testing device. The crosshead was automatically moved, at a rate of 20 inches per minute, until a sample break was detected. An average tensile stress at 100 percent elongation (100 percent modulus) was calculated (TestWorks4 software).

Density

Density is measured in accordance with ASTM D-792-00.

Melt Index

Melt index (I10) for the ethylene-based polymers, in g/10 min, was measured using ASTM D-1238-04 (Condition 190° C./10.0 kg). The notation "I2" refers to a melt index, in g/10 min, measured using ASTM D-1238-04, Condition 190° C./2.16 kg.

The notation "I21" refers to a melt index, in g/10 min, measured using ASTM D-1238-04, Condition 190° C./21.6 kg.

Surface Defects

An impact modified PVC formulation was extruded on a flood-fed twin screw extruder, and formed using a profile die. A typical window profile formulation contains 100 phr PVC (amounts of all other ingredients are relative to PVC); approximately 3 to 4 phr acrylic impact modifier, 3 to 4 phr of the example CPE impact modifiers, 4 phr of Calcium/Zinc stabilizer and lubricants, 4 phr titanium dioxide pigment, 5 phr calcium carbonate filler. Other ingredients such as pigments, heat distortion additives, antistatics, gloss control agents, etc., may also be used. The screw extruder was a conical 45 mm twin screw with vacuum venting. Barrel temperature ranged from 175 to 185° C., with die temperature of 205° C. The die was a window profile geometry, with water cooled vacuum calibration. The number of surface defects visible to the eye was recorded for a six meter length of profile.

The following examples illustrate the present invention, but are not intended to limit the scope of the invention.

EXAMPLES

CPE Preparation

Two polyethylene homopolymers (nominal Mw of 300,000 with density of 0.959 g/cc, and 350,000 with density of 0.955 g/cc) were reacted with chlorine in an aqueous slurry reaction mixture to generate three different chlorinated polymers. The properties of these chlorinated polyethylenes, denoted CPE 1, CPE-2 and CPE-4, are shown in Table 1. The CPE-3 was a blend of CPE-1 and 12 weight percent calcium carbonate, based on the sum weight of the CPE and the calcium carbonate.

For the examples in Table 1, 24 lbs of the ethylene-based polymer, 0.6 lbs talc, 12 ml of surfactant (for example, a polyethylene glycol ester) and 189 lbs water are charged to a reactor, where the mixture is heated from ambient temperature (approximately 27° C.) to 100° C. The chlorine addition started when the slurry temperature reached 100° C. (T1). The gaseous chlorine addition, at a controlled rate of about 0.8 lbs chlorine per pound of polyethylene per hour, proceeded until a maximum temperature, sufficient to disrupt the base polyethylene crystallinity, was reached (T2 from about 129-132 C). During this ramp in temperature, a controlled amount of chlorine is added to the reactor to achieve the desired product total chlorine content and chlorine distribution. For the preferred CPE-4 case of this invention, as well as for CPE-2, 75 weight percent (based on total amount of chlorine added to the reaction mixture) of the total chlorine was added during the reactor temperature ramp. For the undesired case of CPE-1, approximately half the total chlorine was added during the temperature ramp. Each reaction, had a T3 (T3=T2) line out temperature, and during this line out the remainder of the chlorine was added. After the chlorine addition has been completed, the reaction mixture was cooled to near 90° C. The reaction mixture was then transferred into another agitated vessel. After sufficient washing of the residual HCl from the particles, the slurry was cooled, and then dewatered by a centrifuge. The batch of the CPE cake was dried with approximately 2 wt percent (dry basis) calcium stearate in a batch fluid bed dryer. The chlorine addition reactions during the temperature ramp and peak temperature result in less than 2 joules/gram (0.5 cal/gram) of residual crystallinity (measure by DSC in 110° C. to 150° C. temperature range). The chlorinated polyethylene had a modulus value from 1.05-1.51 N/mm².

CPE-4 was chlorinated to 36 percent, by weight, chlorine. CPE-2 and CPE-4 used the same controlled chlorination addition into the reactor, with 60 weight percent, or more, of the chlorine reacted with the polyethylene during the "ramp-up" in temperature and 40 weight percent, or less, of the chlorine reacted with the polyethylene during the "line-out" temperature. The chlorine addition reactions during the temperature ramp and line-out temperature result in less than 2 joules/gram of residual crystallinity (measure in DSC in 110° C. to 150° C. temperature range).

The resultant chlorinated polyethylene, CPE-4 (inventive), had a blocking force of less than 20 psi. This CPE, when used in polyvinylchloride (PVC) formulations for window profiles gave good processing results, and the profile had no visible surface defects in a six meter length of profile. CPE-4 can be used in combination with other impact modifiers, such as acrylic impact modifiers. CP-4 was used at levels from 3 to 8 phr in the PVC formulations.

Melt Extrusion of CPE

The inventive CPE (CPE-4), as described above, and CPE-1, CPE-2 and CPE-3 were each extruded on a flood fed twin screw extruder, with a window profile line. As discussed above, the properties of these polymers and the resultant extrudates are shown in Table 1.

TABLE 1

CPE Properties

| | CPE-1 | CPE-2 | CPE-3 | CPE-4 |
|---|---|---|---|---|
| Chlorine (wt percent) | 34.7 | 35.1 | CPE-1 + 12 wt percent calcium carbonate | 36.3 |
| Residual HDPE Crystallinity (J/g) (cal/g) | 1.50 (0.36 cal/g) | 1.56 (0.37 cal/g) | | 0.54 (0.13 cal/g) |
| Percent Crystallinity (Percent) | 0.8 | 0.8 | | 0.3 |
| 100 Percent Modulus (N/mm²) | 1.05 | 1.51 | | 1.30 |
| Ash (wt percent) | 0.90 | 0.63 | | 1.0 |
| Calcium Stearate (wt percent) | 1.9 | 2.2 | | 1.6 |
| Blocking (psi) | 44.7 | 9.0 | 9.1 | 11.5 |
| Crystallization Temp. Tc (° C.) | 10.6 | 35.4 | | 32.9 |
| Mw of HDPE base polymer (g/mol) | 300,000 | 350,000 | 300,000 | 300,000 |
| Peak Melt Point Tm of HDPE base polymer (° C.) | 136.8 | 137.3 | 136.8 | 136.8 |
| HDPE base polymer Crystallinity (J/g) | 190 | 195 | 190 | 190 |

The "residual HDPE crystallinity (J/g)" refers to the crystallinity in the chlorinated polymer, as measured by DSC, at approximately the same temperature range used to measure the crystallinity in the original HDPE base polymer (crystallization peak typically in the region from 110° C. to 150° C.). The "percent crystallinity" is the weight percentage of crystallinity (or residual crystallinity) in the chlorinated polymer, excluding the weight of bound chlorine. For the purposes of calculation the heat of fusion of 100 percent crystalline polyethylene by DSC will be 290 J/g. A similar method is described in U.S. Pat. No. 6,124,406, incorporated herein, in its entirety, by reference. In this case, the polymer percent crystallinity is referenced against the 100 percent crystallinity value. An example of the percent crystallinity calculation is as follows: The enthalpy of fusion for a chlorinated ethylene-based polymer, containing 36 weight percent chlorine (based on the total weight of polymer), was measured by DSC at $\Delta H_f=5$ Joules/gram. To correct for the chlorine incorporated into the polymer, the $\Delta H_f$ corrected=5/0.64=7.8 Joules/gram (the percent crystallinity referenced against a 100 percent crystallinity value becomes 7.8/290×100=2.7 percent crystallinity.

The extrusion results, and in particular the number of surface defects in a six meter length of profile, are shown in Table 2 below. Each window profile formulation contained 100 phr PVC (amounts of all other ingredients are relative to PVC); approximately 3 to 4 phr acrylic impact modifier, 3 to 4 phr of the example CPE impact modifiers, 4 phr of Calcium/Zinc stabilizer and lubricants, 4 phr titanium dioxide pigment, 5 phr calcium carbonate filler. The screw extruder was a conical 45 mm twin screw with vacuum venting. Barrel temperature ranged from 175 to 185° C., with die temperature of 205° C. The die was a window profile geometry, with water cooled vacuum calibration. The number of surface defects visible to the eye was recorded for a six meter length of profile.

TABLE 2

| Impact Properties and Surface Defects | | | | |
|---|---|---|---|---|
| | CPE-1 | CPE-2 | CPE-3 | CPE-4 |
| Double-V Notched Impact Strength (kJ/m2) | 72 | 63 | — | 74 |
| #Defects in 6 meter profile | 0 | 19 | 0 | 0 |

Note that the crystallization temperature increased from 10.6° C. for comparative example CPE-1, which had poor blocking performance, to 32.9° C. for CPE-4, which had good blocking performance. This increase in crystallization temperature is indicative of more perfect crystalline regions within the polymer structure. In addition, this increase in crystallization temperature is indicative of a polymer of sufficient modulus and crystallization to adequately resist particle-to-particle deformation and cold-flow.

As seen from the data in Tables 1 and 2, comparative example CPE-1 had unacceptable blocking force of 44.7 psi. An acceptable blocking force would be below 20 psi. Comparative example CPE-1 had an acceptable defect number of zero. An acceptable defect number would be less than approximately 10 defects in a six meter profile, and preferably zero. Comparative example CPE-2 had an acceptable blocking force of 9.0 psi, but an unacceptable defect number (19). Comparative example CPE-3 had an acceptable blocking force of 9.1 psi, and an acceptable defect number (0), but this comparative example required an additional step to add the 12 weight percent calcium carbonate, and this additional step is undesirable and costly. Example CPE-4 had an acceptable blocking force of 11.5 psi, and an acceptable defect number of (0).

Thus, comparative example CPE-1 represents the case with acceptable product performance, but unacceptable bulk handleability. Comparative example CPE-2 represents the case with acceptable bulk handleability, but unacceptable product performance. Comparative example CPE-3 represents the case with acceptable bulk handleability and product performance, but undesirable extra antiblock. Example CPE-4 represents the case with acceptable bulk handleability and product performance at relatively low antiblock levels.

Although the invention has been described in certain detail through the preceding specific embodiments, this detail is for the primary purpose of illustration. Many variations and modifications can be made by one skilled in the art, without departing from the spirit and scope of the invention, as described in the following claims.

What is claimed:

1. A chlorinated ethylene-based polymer comprising the following properties:
    a) a percent crystallinity less than 8, as measured by DSC, using a polyethylene heat of fusion of 290 Joules per gram, and
    b) a crystallization temperature, Tc, from 28° C. to 60° C., and
    wherein the chlorinated ethylene-based polymer is formed from an ethylene-based polymer that has a weight average molecular weight, Mw, less than, or equal to, 325,000 g/mol.

2. The chlorinated ethylene-based polymer of claim 1, wherein the ethylene-based polymer has a weight average molecular weight less than, or equal to, 300,000 g/mole.

3. The chlorinated ethylene-based polymer of claim 1, wherein the ethylene-based polymer has a weight average molecular weight greater than 150,000 g/mole.

4. The chlorinated ethylene-based polymer of claim 1, wherein the ethylene-based polymer is an HDPE.

5. The chlorinated ethylene-based polymer of claim 1, wherein the chlorinated ethylene-based polymer has a percent crystallinity less than 5.

6. The chlorinated ethylene-based polymer of claim 1, wherein the chlorinated ethylene-based polymer has a percent crystallinity less than 2.

7. The chlorinated ethylene-based polymer of claim 1, wherein the chlorinated ethylene-based polymer has a crystallization temperature, Tc, from 28° C. to 50° C.

8. The chlorinated ethylene-based polymer of claim 1, wherein the chlorinated ethylene-based polymer has a crystallization temperature, Tc, from 28° C. to 40° C.

9. The chlorinated ethylene-based polymer of claim 1, wherein the chlorinated ethylene-based polymer contains from 20 to 50 weight percent chlorine, based on the total weight of polymer.

10. The chlorinated ethylene-based polymer of claim 1, wherein the chlorinated ethylene-based polymer exhibits a "100 percent modulus" value of greater than 1.15 N/mm$^2$, and a crystallization temperature of greater than 28° C.

11. The chlorinated ethylene-based polymer of claim 1, wherein the chlorinated ethylene-based polymer has a blocking force of 20 psi or less.

12. A composition comprising the chlorinated ethylene-based polymer of claim 1.

13. The composition of claim 12, further comprising an ethylene/alpha-olefin interpolymer.

14. The composition of claim 12, further comprising an acrylic polymer.

15. The composition of claim 12, further comprising a vinyl chloride polymer.

16. The composition of claim 13, further comprising a vinyl chloride polymer.

17. The composition of claim 14, further comprising a vinyl chloride polymer.

18. An article comprising at least one component formed from the chlorinated ethylene polymer of claim 1.

19. An article comprising at least one component formed from the composition of claim 12.

20. An article comprising at least one component formed from the composition of claim 13.

21. An article comprising at least one component formed from the composition of claim 14.

22. An article comprising at least one component formed from the composition of claim 15.

23. An article comprising at least one component formed from the composition of claim 16.

24. An article comprising at least one component formed from the composition of claim 17.

25. The article of claim 19, wherein the article is formed by an extrusion process.

26. The article of claim 25, wherein the article is an extrusion profile.

27. The article of claim 26, wherein the extrusion profile has ten or less surface defects per six meters of profile.

28. The article of claim 25, wherein the article is selected from the group consisting of sheets, siding, pipes, tubes, window profiles, fencing, decking, and electrical conduits.

29. A chlorinated ethylene-based polymer comprising the following properties:
    a) a percent crystallinity less than 8, as measured by DSC, using polyethylene heat of fusion of 290 Joules per gram, and
    b) a crystallization temperature, Tc, from 25° C. to 80° C., and wherein the chlorinated ethylene polymer is formed from an ethylene-based polymer that has a weight average molecular weight, Mw, less than, or equal to, 325,000 g/mole and greater than 150,000 g/mole.

30. The chlorinated ethylene-based polymer of claim 29, wherein the ethylene-based polymer has a weight average molecular weight less than, or equal to, 300,000 g/mole.

31. The chlorinated ethylene-based polymer of claim 29, wherein the ethylene-based polymer has a weight average molecular weight greater than 175,000 g/mole.

32. The chlorinated ethylene-based polymer of claim 29, wherein the ethylene-based polymer is an HDPE.

33. The chlorinated ethylene-based polymer of claim 29, wherein the chlorinated ethylene-based polymer has a percent crystallinity less than 5.

34. The chlorinated ethylene-based polymer of claim 29, wherein the chlorinated ethylene-based polymer has a percent crystallinity less than 2.

35. The chlorinated ethylene-based polymer of claim 29, wherein the chlorinated ethylene-based polymer has a crystallization temperature, Tc, from 25° C. to 60° C.

36. The chlorinated ethylene-based polymer of claim 29, wherein the chlorinated ethylene-based polymer has a crystallization temperature, Tc, from 25° C. to 50° C.

37. The chlorinated ethylene-based polymer of claim 29, wherein the chlorinated ethylene-based polymer contains from 20 to 50 weight percent chlorine, based on the total weight of polymer.

38. The chlorinated ethylene-based polymer of claim 29, wherein the chlorinated ethylene-based polymer exhibits a "100 percent modulus" value of greater than 1.15 N/mm$^2$, and a crystallization temperature of greater than 28° C.

39. The chlorinated ethylene-based polymer of claim 29, wherein the chlorinated ethylene-based polymer has a blocking force of 20 psi or less.

40. A composition comprising the chlorinated ethylene-based polymer of claim 29.

41. The composition of claim 40, further comprising an ethylene/alpha-olefin interpolymer.

42. The composition of claim 41, further comprising an acrylic polymer.

43. The composition of claim 40, further comprising a vinyl chloride polymer.

44. The composition of claim 41, further comprising a vinyl chloride polymer.

45. The composition of claim 42, further comprising a vinyl chloride polymer.

46. An article comprising at least one component formed from the composition of claim 40.

* * * * *